United States Patent Office 3,019,080
Patented Jan. 30, 1962

3,019,080
PROCESS FOR THE PRODUCTION OF ALUMINA
George Clarkson Vincent, Norton-on-Tees, England, assignor to Imperial Chemical Industries Limited, London, England, a company of Great Britain
No Drawing. Filed Apr. 30, 1958, Ser. No. 731,888
Claims priority, application Great Britain May 16, 1957
6 Claims. (Cl. 23—143)

This invention relates to the production of alumina.

It is known to produce alumina by the hydrolysis of an aluminum alkoxide. The alumina produced by this process, providing that it is substantially pure, is particularly suitable for the preparation of highly active catalysts in which alumina is an active ingredient or is used as a support.

Previously, the required purity of the alumina has been ensured by the use of aluminium having a purity of at least 99.9% in the preparation of the alkoxide by reacting aluminium with an alcohol.

It would be of considerable advantage if less pure aluminium could be used in the preparation of the alkoxide. However, when this preparation is carried out, using aluminium of purity less than 99.9%, the resulting solution of alkoxide in alcohol contains impurities, originating from the aluminium, in a colloidal form which only deposit very slowly from the solution. The alumina produced by the hydrolysis of such an alkoxide solution thus may contain appreciable amounts of impurities which may affect adversely the activity of catalysts prepared from the alumina.

We have now found that these colloidal impurities present in the alkoxide solution can be made to deposit relatively quickly from the solution by the addition of a hydrocarbon and that the resulting purified solution can be hydrolysed to give substantially pure alumina.

According to the present invention, therefore, there is provided a process for the production of substantially pure alumina which comprises the steps of reacting aluminium with an alcohol to form a solution of an aluminium alkoxide in the alcohol, adding a hydrocarbon or mixture of hydrocarbons to the solution to effect deposition of impurities suspended in the solution, separating the impurities and hydrolysing the alkoxide.

The process of the invention is particularly applicable to aluminium of purity less than 99.9% for example 99.5%.

A wide range of alcohols may be used to form the alkoxide. Particularly suitable alcohols are ethanol, propanols and butanols.

The hydrocarbon should be liquid under the conditions of the process and should be at least partially miscible with the alcoholic solution of the alkoxide and it should preferably be easily separable from the alkoxide by distillation.

A variety of hydrocarbons may be used in the process. Examples of very suitable hydrocarbons are paraffinic hydrocarbons such as pentanes and hexanes. Aromatic hydrocarbons such as benzene, toluene and xylenes are also suitable.

Mixtures of hydrocarbons may be used, for example, petroleum ether boiling in the range 40° to 60° C.

The volume of the hydrocarbon used should preferably be approximately equal to the volume of the solution of the alkoxide in the alcohol. Volumes greater or less than this preferred volume may, however, be used.

Though the deposition of the impurities by the hydrocarbon may be facilitated by heating the mixture of hydrocarbon, alcohol and alkoxide to temperatures below the boiling point of the mixture, it is preferred that the deposition step is carried out at ambient temperatures.

The impurities may be separated from the alkoxide solution by a variety of methods, for example, by filtering or centrifuging. A particularly suitable method is decantation followed by filtration of the supernatant liquid.

Following the separation of the impurities the hydrocarbon may be separated from the alkoxide solution preferably by distillation, and the alkoxide is then hydrolysed. The recovered hydrocarbon which may contain some of the alcohol may then be re-used in the process.

The alkoxide may be hydrolysed by a variety of hydrolysing agents. Very suitable hydrolysing agents are water and aqueous solutions of ammonia.

*Example*

A solution containing aluminium isopropoxide was prepared by contacting small pieces of aluminium (99.5% Al) with hot vapours of isopropanol. 10 litres of this solution containing approximately 80% aluminium isopropoxide were placed in a 20 litre vessel which was then filled up with petroleum ether, boiling range 40° to 60°.C. A black sludge consisting mainly of iron settled to the bottom of the vessel.

The mixture of petroleum ether, aluminium isopropoxide and isopropanol was then decanted from the sludge, filtered and the petroleum ether distilled off. The solution of isopropoxide in isopropanol was then added gradually to excess boiling water and the resulting precipitate of hydrated aluimina filtered off, dried and calcined.

I claim:

1. A process for the production of substantially pure alumina which comprises the steps of reacting aluminium with a monohydric alcohol containing from 2 to 4 carbon atoms to form a solution of an aluminum alkoxide in the alcohol, said aluminum containing impurities which exist in colloidal form upon reaction with said alcohol, adding to the solution at least one liquid hydrocarbon selected from the group consisting of pentane, hexane, benzene, toluene, xylene, and petroleum ether, to effect deposition of said impurities, separating said impurities from the solution, thereafter hydrolyzing the alkoxide, and recovering pure alumina therefrom.

2. A process as claimed in claim 1 in which the volume of the hydrocarbon used is approximately equal to the volume of the solution of the alkoxide in the alcohol.

3. A process as claimed in claim 1 in which the hydrocarbon is separated by distillation from the purified alkoxide solution prior to the hydrolysis of the alkoxide.

4. A process as claimed in claim 1 in which the alkoxide is hydrolysed by a hydrolysing agent selected from the group consisting of water and aqueous solutions of ammonia.

5. A process as claimed in claim 1 wherein the alcohol is isopropanol.

6. A process as claimed in claim 1 wherein the hydrocarbon is a petroleum ether having a boiling range 40° C. to 60° C.

References Cited in the file of this patent

UNITED STATES PATENTS

| | | |
|---|---|---|
| 2,636,865 | Kimberlin | Apr. 28, 1953 |
| 2,796,326 | Kimberlin et al. | June 18, 1957 |
| 2,809,169 | Whiteley et al. | Oct. 8, 1957 |
| 2,917,365 | Gilbert | Dec. 15, 1959 |